(12) United States Patent
Wada

(10) Patent No.: US 12,320,895 B2
(45) Date of Patent: Jun. 3, 2025

(54) FISH FINDER SYSTEM AND METHOD

(71) Applicant: Furuno Electric Co., Ltd., Hyogo (JP)

(72) Inventor: Tomoo Wada, Ashiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 220 days.

(21) Appl. No.: 18/083,188

(22) Filed: Dec. 16, 2022

(65) Prior Publication Data

US 2024/0201372 A1 Jun. 20, 2024

(51) Int. Cl.
*G01S 15/96* (2006.01)
*A01K 97/12* (2006.01)

(52) U.S. Cl.
CPC ............ *G01S 15/96* (2013.01); *A01K 97/125* (2013.01)

(58) Field of Classification Search
CPC .............................. G01S 15/96; A01K 97/125
See application file for complete search history.

(56) References Cited

U.S. PATENT DOCUMENTS

| 7,161,872 | B2 | 1/2007 | Kuriyama et al. | |
| 7,523,881 | B2 | 4/2009 | Hitomi et al. | |
| 7,559,499 | B2 | 7/2009 | Nakagawa et al. | |
| 2016/0061980 | A1* | 3/2016 | Tonchia | B63H 25/04 701/21 |
| 2016/0245915 | A1* | 8/2016 | Clark | G01S 7/6281 |
| 2022/0061291 | A1* | 3/2022 | Yasuda | A01K 89/0122 |
| 2022/0390542 | A1* | 12/2022 | Clark | G09B 29/003 |

* cited by examiner

*Primary Examiner* — Isam A Alsomiri
*Assistant Examiner* — Abdallah Abulaban
(74) *Attorney, Agent, or Firm* — Alleman Hall & Tuttle LLP

(57) ABSTRACT

A fish finder system for a vessel is provided with an interface to connect with a transducer configured to transmit an ultrasonic signal into a water body and receive a reflected echo signal, and an autopilot device configured to control a rudder being attached to the vessel. Further, the fish finder system is provided with processing circuitry communicatively coupled to the interface and configured to detect a position of a fishing rig, measure a vector from the vessel to the fishing rig, and generate a rudder control signal for the autopilot device to control the rudder based on the measured vector.

13 Claims, 16 Drawing Sheets

FISH FINDER SYSTEM AND METHOD

TECHNICAL FIELD

The present disclosure relates to a fish finder system and a method for tracking and displaying a fishing rig on a display screen.

BACKGROUND

Typically, a fish finder is used for detecting objects present into a water body such as a seabed, a fish school, or any other water creatures below a vessel on which the fish finder is used. The fish finder system works on a principle of ultrasound waves and normally comprises a transmitter and a receiver. The transmitter is responsible to transmit the ultrasound waves towards the water body where the objects can be detected. The ultrasound waves tend to reflect upon striking the objects that come in a way as an obstacle. Thus, the reflected ultrasound waves are then caught by the receiver and processed further to detect a presence and location of the fish school below the vessel.

Currently, in order to catch fish from the detected fish school, different fishing rigs are used by fishermen. Mostly, a common fishing rig known as a bank sinker is used along a main line of the fishing rig to sink the fishing rig deep under the water body. Also, one or more hooks having baits on them and connected with a main line to reach near the fish school and catch the fish. To target specific fish school, the position of the fishing rig under the water body should be known by the fisherman. The fisherman usually predicts the position based on the experience. But the position of the fishing rig under the water body depends on a tidal current and the movement or a speed of the vessel. However, the fishing rig can only be detected and displayed on a display screen if the vessel is above the fishing rig. Whereas the tidal current and a self-movement of the vessel make it difficult for the vessel to stay above the fishing rig and continuously display the fishing rig.

In view of these problems, it is an object of the present disclosure to provide a fish finder system and a method capable of tracking and continuously displaying a fishing rig on the display screen.

SUMMARY

The present disclosure discloses a fish finder system for a vessel, a method, and a non-transitory computer-readable medium that may continuously display a fishing rig. An aspect of the present disclosure relates to a fish finder system for a vessel, provided with an interface that is configured to connect with a transducer and an autopilot device. The transducer is configured to transmit an ultrasonic signal into a water body and receive a reflected echo signal. The autopilot device is configured to control a rudder being attached to the vessel. Further, the fish finder system comprises processing circuitry communicatively coupled to the interface. The processing circuitry is configured to detect a position of the fishing rig, measure a vector from the vessel to the fishing rig, and generate a rudder control signal for the autopilot device to control the rudder based on the measured vector. The rudder control signal is generated so as to cancel the measured vector and thereafter, the fishing rig is displayed on a display screen.

DETAILED DESCRIPTION

Figure 1:
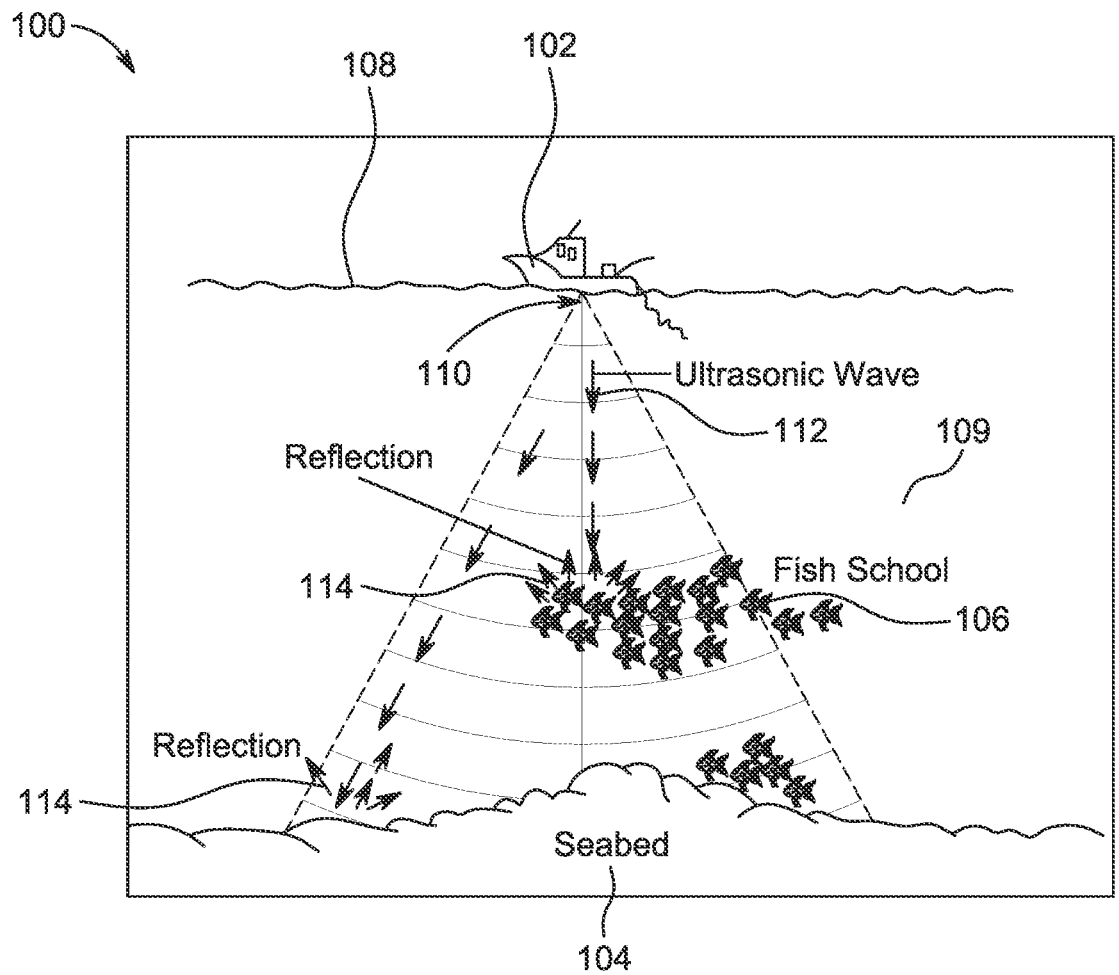
FIG. 1 is a schematic diagram showing transmitted and reflected ultrasound waves, according to an embodiment of the present disclosure.

Embodiments of the present disclosure will be described below with reference to the drawings. The same reference numerals are given to the same or corresponding parts in the figure, and the description thereof will not be repeated. At least some of the embodiments described below may be arbitrarily combined.

FIG. 1 is a schematic diagram showing transmitted and reflected ultrasound waves, according to an embodiment of the present disclosure.

Referring to FIG. 1, the fish finder system 100 may be installed on a vessel 102 to detect objects such as a seabed 104 and one or more fish schools 106 present under a sea surface 108. The fish finder system 100 includes a transducer 110 configured on a bottom of the vessel 102. The transducer 110 may transmit ultrasonic signals 112 into a water body 109 underneath the vessel 102 (sea surface 108). The ultrasonic signals 112 tends to reflect a part of the transmitted ultrasonic signal upon striking on the objects that come in its way.

The transducer 110 may be a multi-beam transducer that may scan wide range of depth and width to provide more practical information. The ultrasonic signals 112 may be a multi-beam ultrasonic signal. The multi-beam ultrasonic signal may be a fan-shaped ultrasonic signal or the single beam ultrasonic signal transmitted in multiple directions.

The transducer 110 may receive an echo signal 114 reflected from the seabed 104 and the fish school 106 or any other object present within the water body 109.

The fish finder system 100 processes the received echo signal 114 by amplifying, and converting into a digital signal, and filtering the digital signal to display an echo image corresponding to the received echo signal 114.

Figure 2:
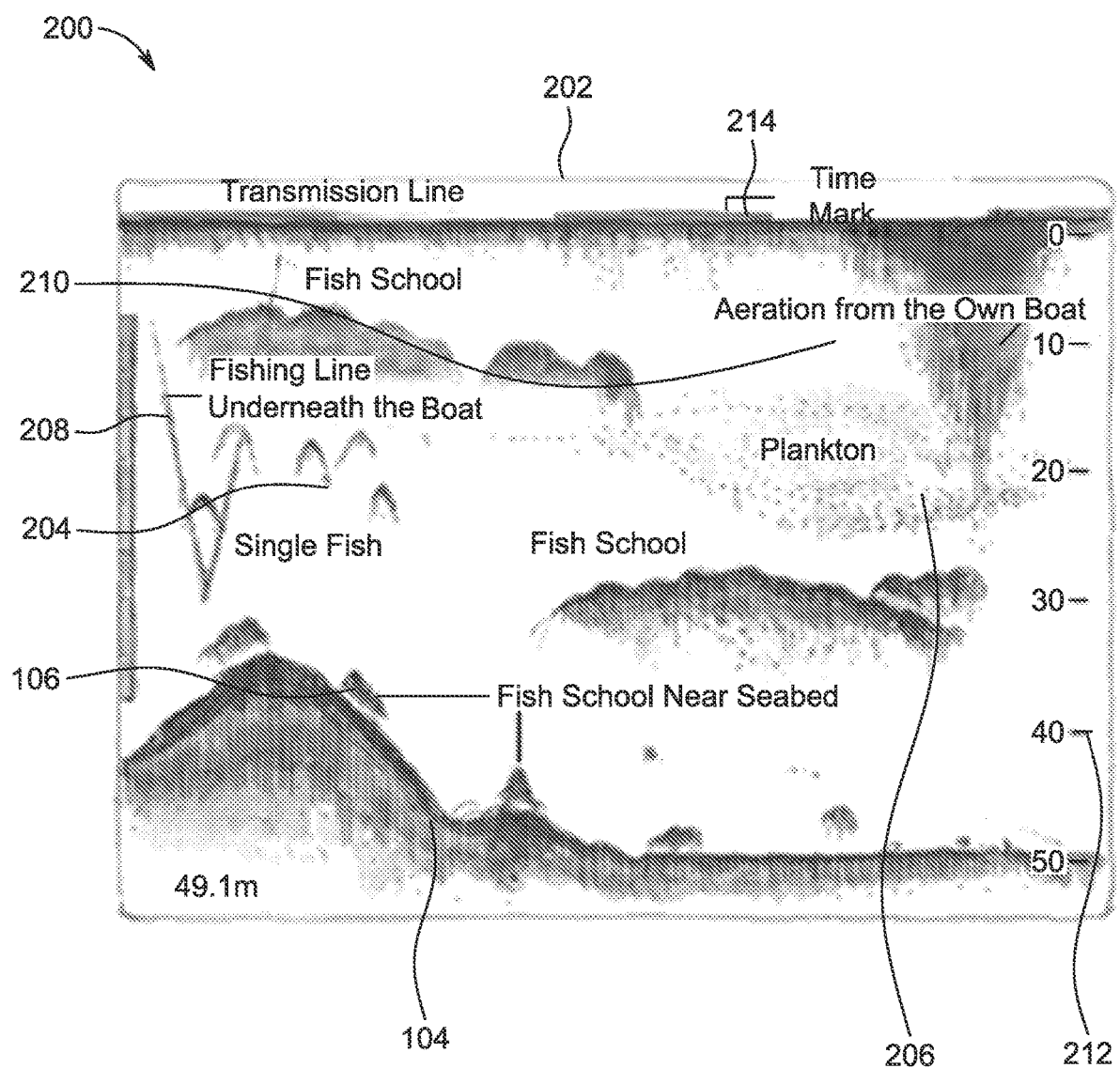
FIG. 2 is fish finder display mode of the graphical display example of a fish and one or more fish schools, according to an embodiment of the present disclosure.

FIG. 2 is fish finder display mode 200 of the graphical display example of a fish and the one or more fish schools 106, according to an embodiment of the present disclosure. FIG. 2 is described in conjunction with FIG. 1.

The fish finder system 100 displays the objects present within the water body 109 on a display screen 202 based on the received echo signal 114 by the transducer 110. The objects may be any of, such as the seabed 104, the one or more fish schools 106 at different depths, one or more single fish 204, a plankton 206, a fishing line 208 present underneath the vessel 102, aeration 210 generated from the vessel 102, or any other object present within the water body 109.

Further, the fish finder system 100 may display a depth scale 212 with a marking of depths on the display screen 202. The depth scale 212 provides information of depth of the objects under the sea surface 108, and thus, enables calculation of distance between the objects and the vessel 102. Further, the fish finder system 100 may display a time mark 214 for the received echo signal 114 on the display screen 202 to show the time of reception of the received echo signal 114 that is being displayed.

It is to be noted that, the objects may be displayed in different colors based on the intensity of the received echo signal 114 corresponding to the objects. Further, the fish finder system 100 may show an intensity scale on the display screen 202 by showing colors corresponding to a level of intensity.

Figure 3A:
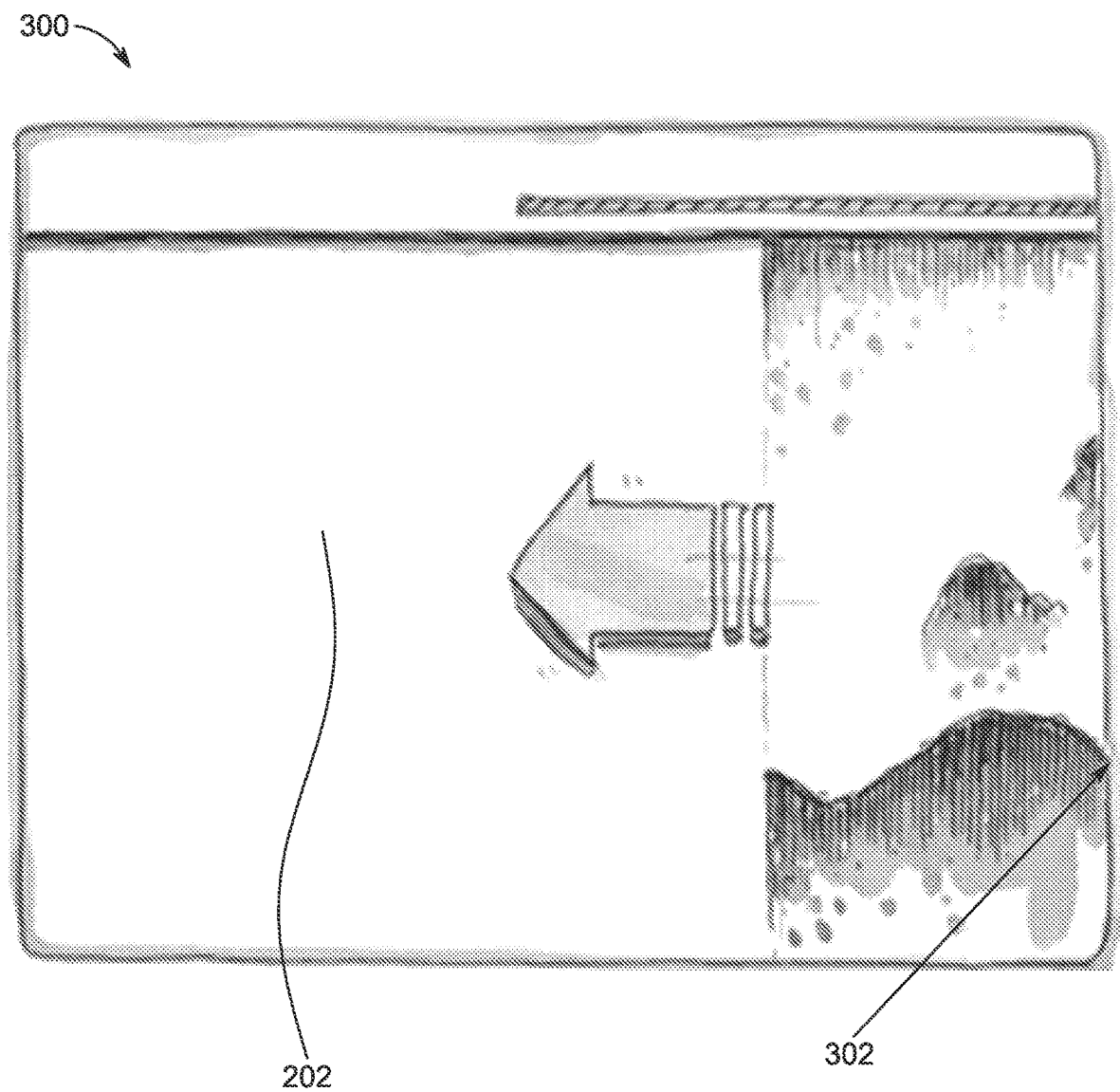
FIG. 3A is an image showing scrolling of an echo image on a display screen by a fish finder transducer with respect to time, according to an embodiment of the present disclosure.

FIG. 3A is an image 300 showing scrolling of an echo image on the display screen 202 of the fish finder system 100 with respect to time, according to an embodiment of the present disclosure. FIG. 3A is described in conjunction with FIG. 1.

The received echo signal 114 corresponding to the objects present within the water body 109 is sequentially received by the transducer 110 with respect to time. Further, based on the time of reception of the received echo signal 114, the echo image corresponding to the received echo signal 114 is displayed sequentially. The fish finder system 100 may display a most recent echo image corresponding to a most recent received echo signal 302 on the right side of the display screen 202.

It can be noted that the reception of each consequent most recent received echo signal 302, the echo image corresponding to a previously received echo signal is scrolled to a left side. Further, a newly received echo signal is displayed on a right side of the display screen 202.

Therefore, the echo image needs to be scrolled from the right side to the left side of the display screen 202 with respect to time. The right side of the display screen 202 displays what the fish finder system 100 sees in that specific instant, and the echo image automatically scrolls to the left with respect to time for reception of the new received echo signal.

In an embodiment, the speed of scrolling is kept at a constant speed. In another embodiment, the speed of scrolling may be changed to increase or decrease the speed of scrolling to find a comfortable setting, either automatically or manually. For instance, when the detected depth is shallow, the speed of scrolling might be high whereas when the depth is deep, the speed of scrolling might be low (since in deeper water, the sound takes longer to reach the bottom), and when the speed of scrolling is set to high, even a small fish school 106 shows up as a large echo image on the display screen 202.

Figure 3B:
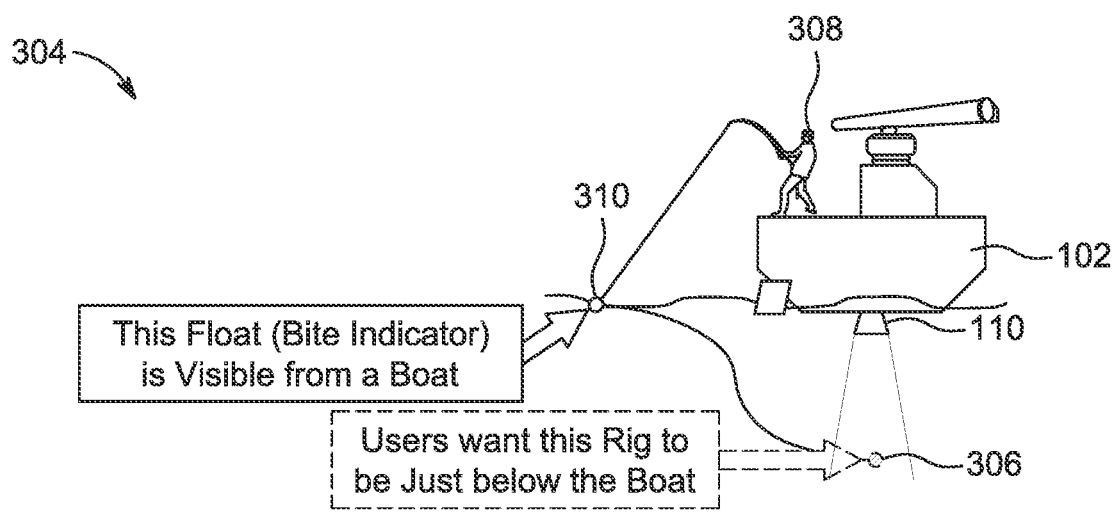
FIG. 3B is a system diagram illustrating a fishing rig below a vessel for being displayed the display screen of the fish finder system, according to an embodiment of the present disclosure.

FIG. 3B is a system diagram 304 illustrating a fishing rig 306 below the vessel 102 for being displayed on the display screen 202 by the fish finder system 100, according to an embodiment of the present disclosure. FIG. 3B is described in conjunction with FIG. 1.

A fisherman 308 throws the fishing rig 306 and wishes to see the fishing rig 306 at the right side of the display screen 202. It would be preferable for the fishing rig 306 to be present right below the vessel 102 to be detected by the transducer 110.

Referring to FIG. 3B, when the fisherman 308 drops the fishing rig 306 from the vessel 102 under the sea surface 108, a bite indicator 310 of the fishing rig 306 is visible from the fisherman 308 on the vessel 102 on the sea surface 108 due to its buoyancy. The bite indicator 310 is buoyant in nature therefore the fishing rig 306 does not sink under the sea surface 108. It can be noted that some length of the fishing rig 306 sinks under the sea surface 108. The fishing rig 306 location and position is detected when the fishing rig 306 comes just below the vessel 102, precisely speaking, just below the transducer 110, due to an effect of tidal current.

As soon as the fishing rig 306 comes below the vessel 102 (the transducer 110), the transducer 110 detects the echo signal 114 corresponding to the fishing rig 306. Successively, the fishing rig 306 is being displayed on the right side of the display screen 202, as shown in FIG. 3C as the received echo signal 302 i.e., most recent return signal.

Figure 3C:
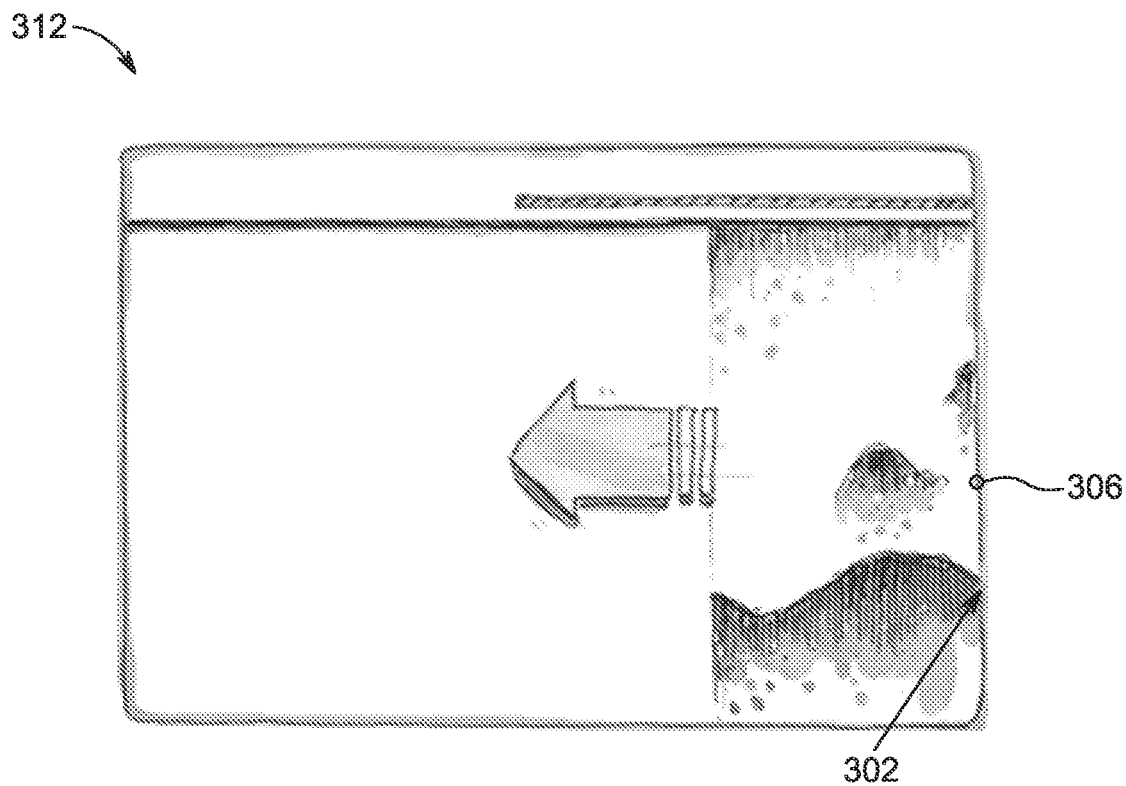
FIG. 3C is an image showing the fishing rig shown in FIG. 2B being displayed on the display screen by the fish finder transducer, according to an embodiment of the present disclosure.

Referring to FIG. 3C, an image 312 showing the fishing rig 306 being displayed on the display screen 202 by the fish finder system 100, according to an embodiment of the present disclosure. As the display screen 202 scrolls left, the most recent received echo signal 302 is displayed along the position of the fishing rig 306.

Figure 4A:
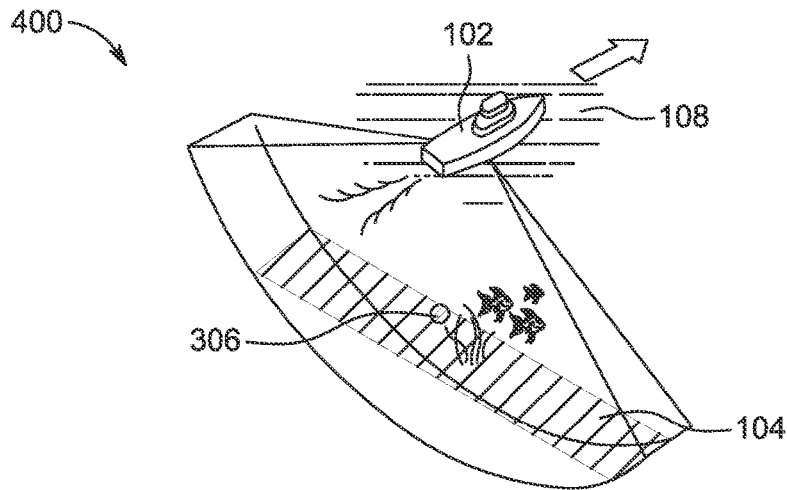
FIG. 4A is an image showing an example of the fishing rig detection by the fish finder system, according to an embodiment of the present disclosure.
Figure 4B:
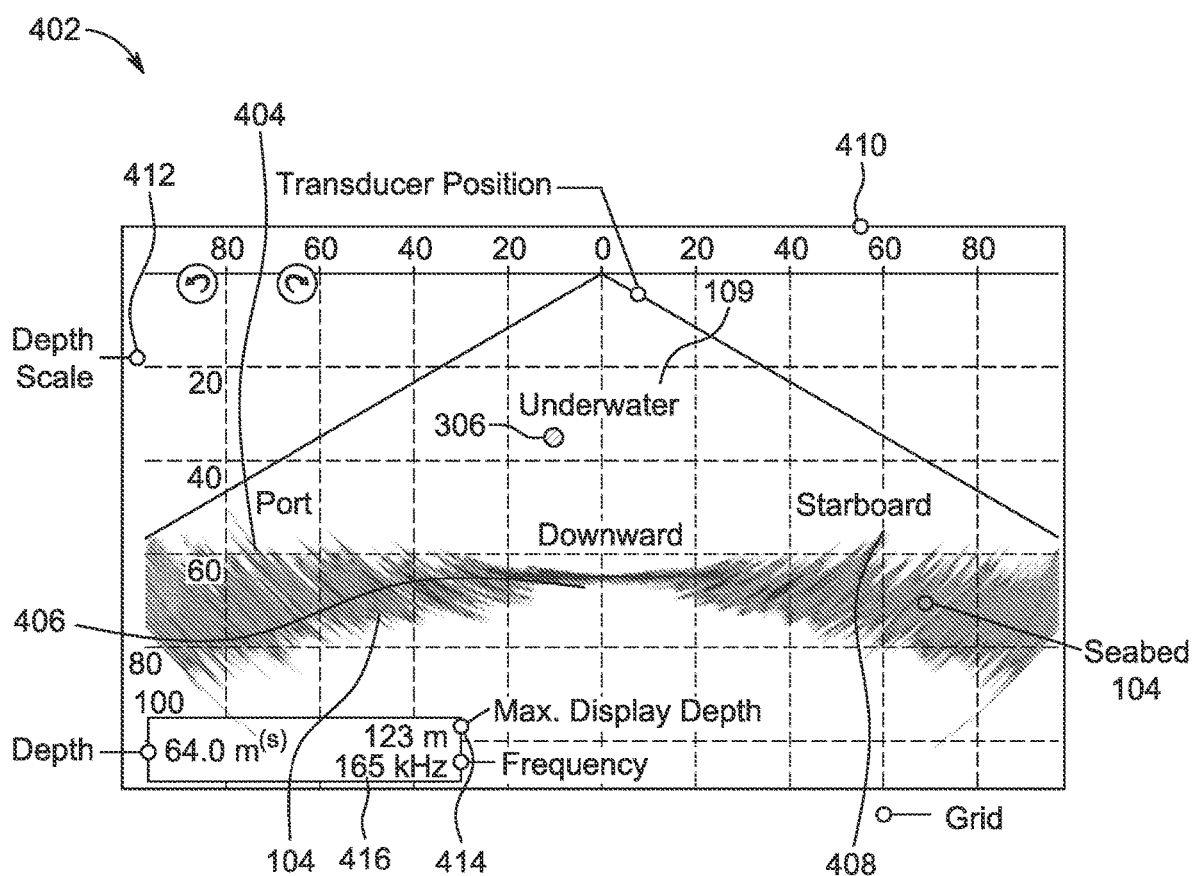
FIG. 4B shows a display example of the fishing rig detection by the fish finder system, according to an embodiment of the present disclosure.

FIG. 4A is an image 400 showing an example of the fishing rig 306 detection by the fish finder system 100, according to an embodiment of the present disclosure. FIG. 4B shows a display example 402 of the fishing rig 306 detection by the fish finder system 100, as shown in FIG. 4A, according to an embodiment of the present disclosure.

As discussed above, the fish finder system 100 may be installed on the vessel 102. Further, the fish finder system 100 includes the transducer 110 that may be disposed at the bottom surface of the vessel 102 in any configuration suitable for detection of the objects including the fishing rig 306 present within the water body 109.

The transducer 110 is the multi-beam transducer that transmits ultrasonic signals into the water body 109 and scans wide range of depth and width to provide more practical information of the fishing rig 306. For example, approximately 135 meters of depth and 120 degrees of width.

The transducer 110 may be equipped with modes such as a cross-section display mode and a three-dimensional (3D) history screen mode. In the cross-section display mode, the transducer 110 scans approximately up to 123 meters of depth and 120 degrees of width from left to right.

Referring to FIGS. 4A and 4B, the transmitted ultrasonic signal 112 scans a sector shape portion within the water body 109 and detects the position of the fishing rig 306 above the seabed 104 within the water body 109 and one or more fish schools 106 present under the sea surface 108. In other words, the transducer 110 transmits the fan-shaped ultrasonic signal and receives the echo signal 114. Then draws the seabed 104 of the sector shape on the display screen 202 in the cross-section display mode. Successively, the depth and the position of the seabed 104, the fish school 106, and the fishing rig 306 above the seabed 104 are displayed. In this embodiment, the transducer 110 scans a maximum display depth of 123 meters and a width of 120 degrees from the transducer 110.

Further, the transducer 110 transmits the ultrasonic signal 112 into three directions of the water body 109 and receives the reflected echo signal 114. The three directions correspond to a port direction, a downward direction, and a starboard direction. The three directions cover an area from the port direction, the downward direction, and the starboard direction of the vessel 102 above the seabed 104.

Further, the fish finder system 100 divides the display screen 202 in separate sections to display an echo image from each direction. The section associated with, to display the echo image from the port direction, is referred as a port screen 404. The section associated with, to display the echo image from the downward direction, is referred as a downward screen 406. The section associated with, to display the echo image from the starboard direction, is referred as a starboard screen 408.

According to the present embodiment, the fishing rig 306 is present and detected by the transducer 110 below the vessel 102. Therefore, the transducer 110 displays the fishing rig 306 on the downward screen 406, as shown in FIG. 4B.

It is to be noted that the port screen 404, the downward screen 406, and the starboard screen 408 are shown respectively from left to right on the display screen 202 under the ordinary use cases, but they are not limited to in this order.

Further, the fish finder system 100 may display a horizontal range scale 410 and a depth scale 412. The horizontal range scale 410 represents an operational range of the transducer 110. The depth scale 412 represents the depth of the seabed 104 from the vessel 102 (the sea surface 108).

Further, the fish finder system 100 may display a maximum display depth 414 and a frequency 416 of the transmitted ultrasonic signal 112 by the transducer 110. For example, the maximum display depth 414 of the transmitted ultrasonic signal 112 is 135 meters and the frequency 416 is 165 kilo Hertz (kHz).

Figure 4C:
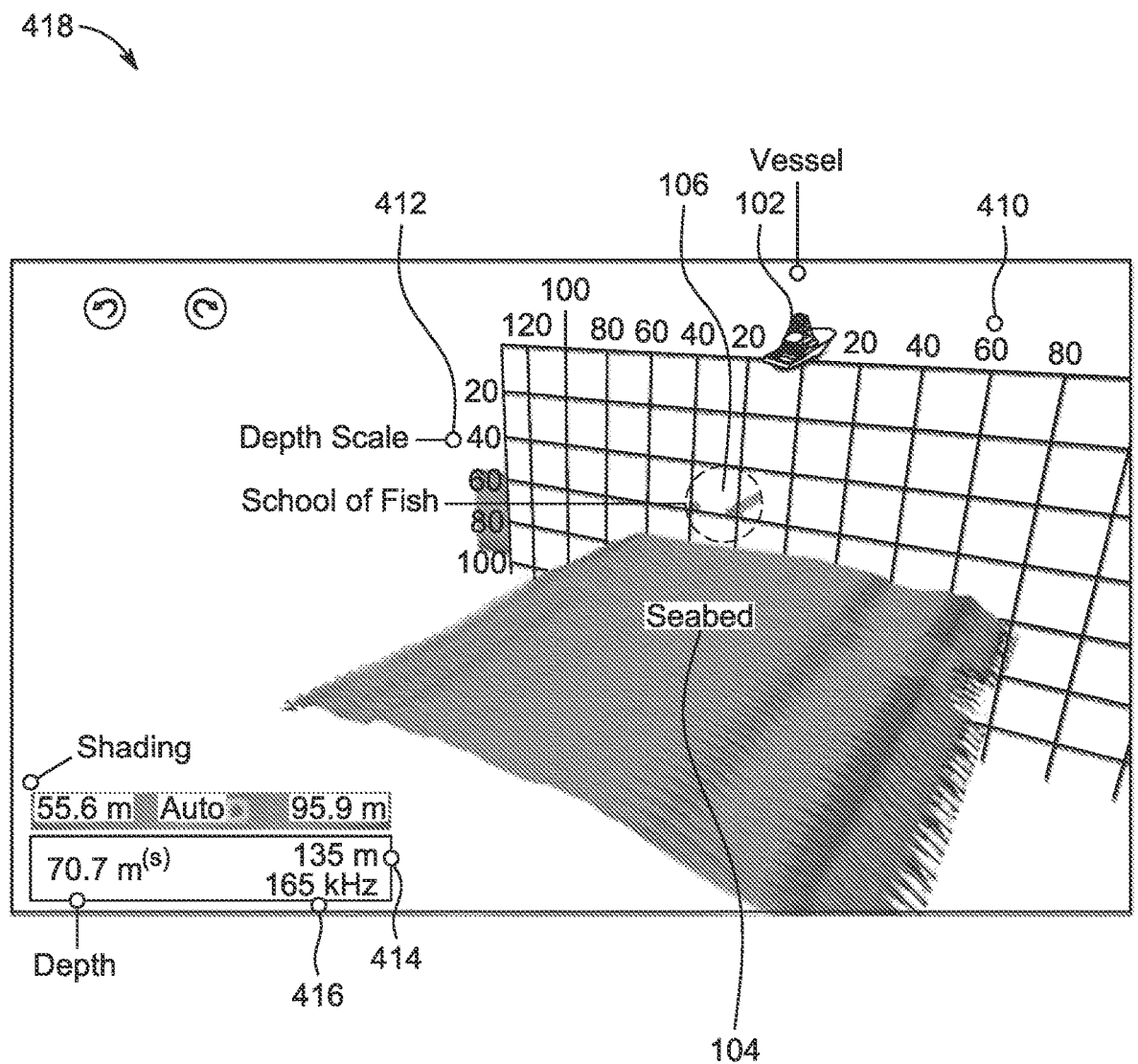
FIG. 4C shows another display example of the fishing rig detection by the fish finder system, according to an embodiment of the present disclosure.

FIG. 4C shows another display example 418 of the fishing rig 306 detection by the fish finder system 100, according to an embodiment of the present disclosure.

The display example 418 is the 3D history screen mode of the fish finder system 100. The fish finder system 100 may show one or more 3D images with enhanced visibility to understand a relationship between the vessel 102 and the fishing rig 306. The 3D history screen mode of the fish finder system 100 is suitable for selecting fishing points and grasping changes in the shape of the seabed 104. Further, the 3D history screen mode of the fish finder system 100 is suitable for grasping movement of the fishing rig 306 with respect to the vessel 102.

It may be noted that echo image of the seabed 104, the fish school 106, and the fishing rig 306 may vary in shape, intensity, hue, and distribution, based on a 3D information detected from the received echo signal 114 by the transducer 110.

Figure 5A:
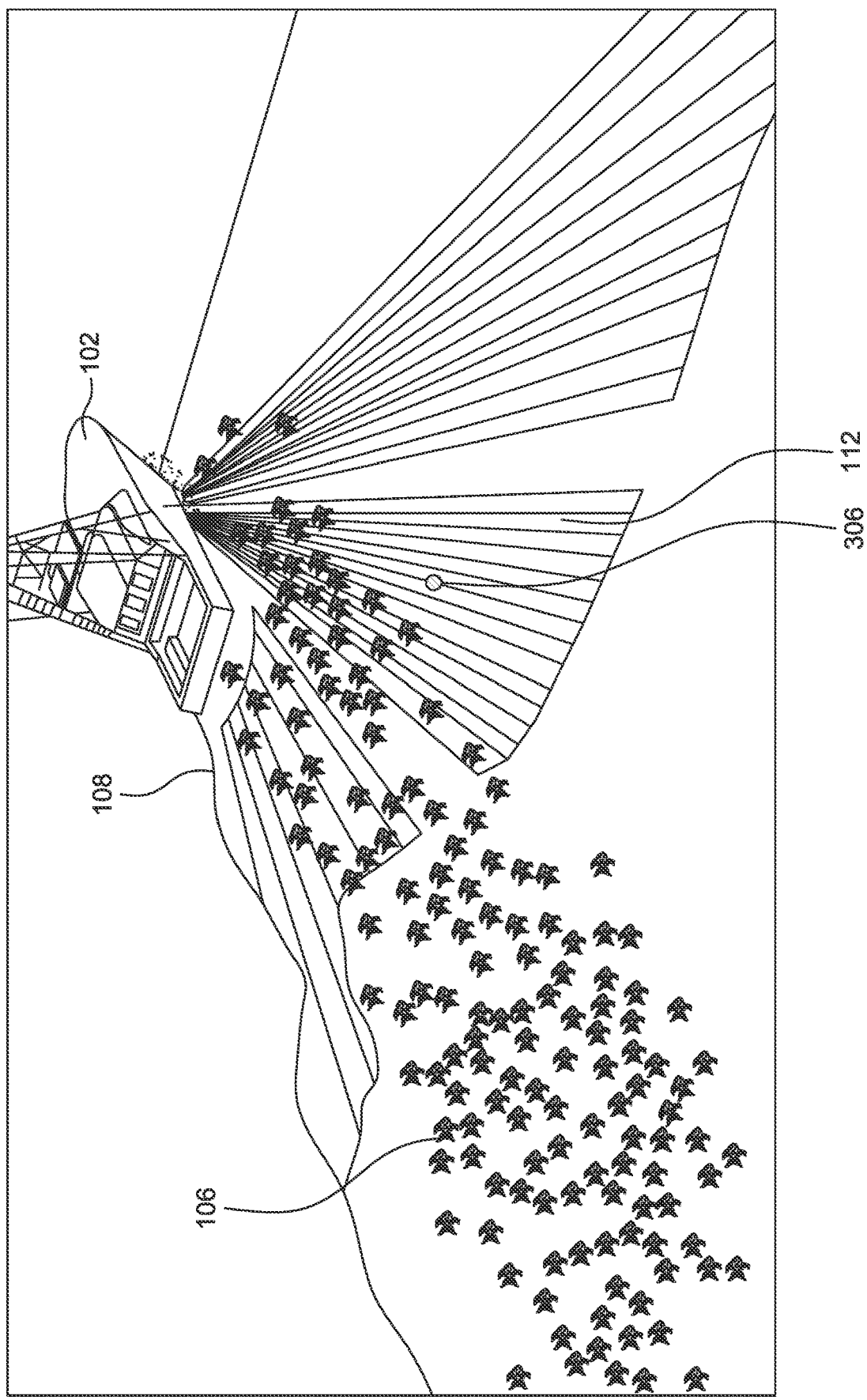
FIG. 5A shows another example of the fishing rig detection by the fish finder system, according to an embodiment of the present disclosure.
Figure 5B:
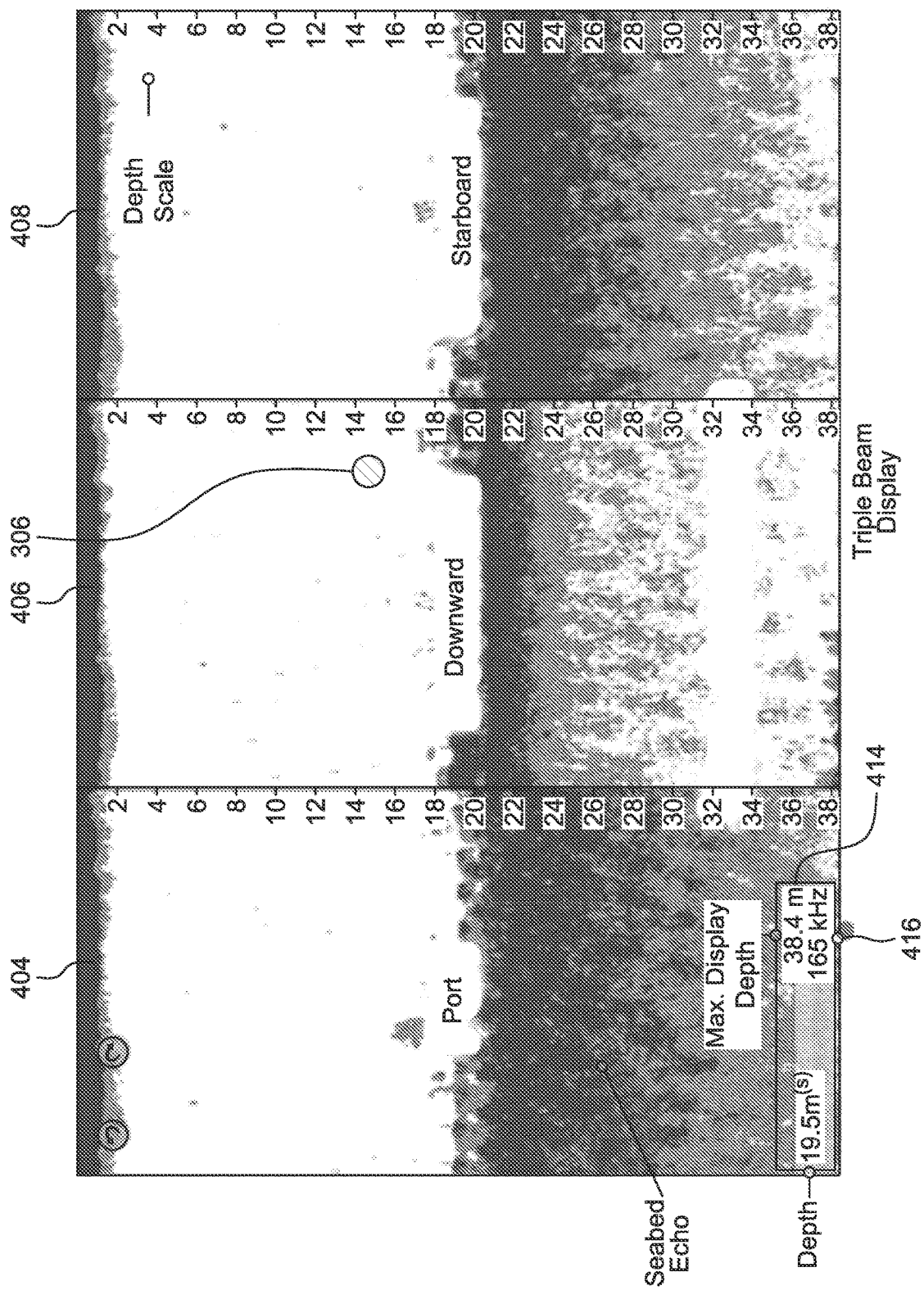
FIG. 5B shows a display example of the fishing rig detection by the fish finder system as shown in FIG. 5A, according to an embodiment of the present disclosure.
Figure 5C:
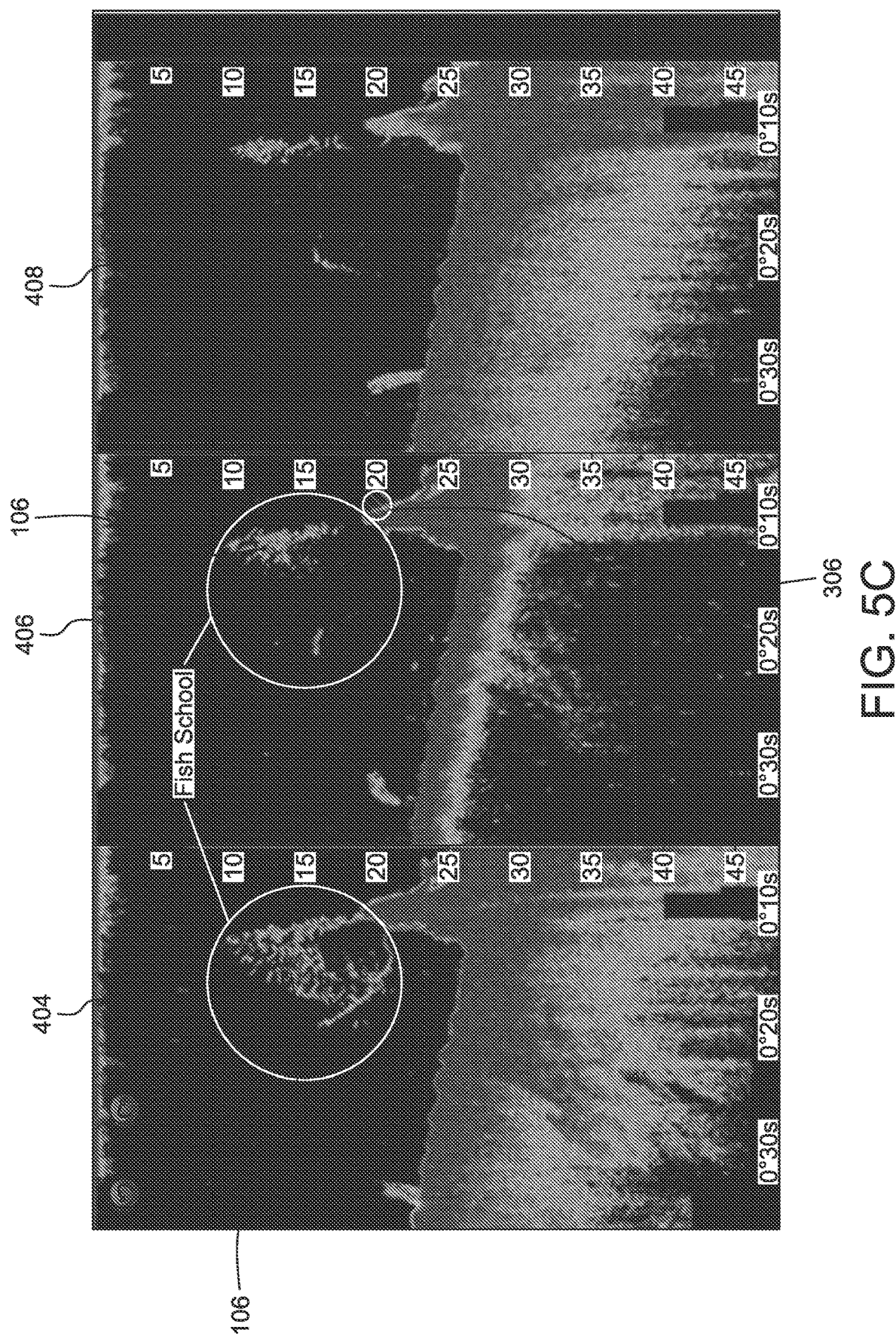
FIG. 5C shows another display example of the fishing rig detection by the fish finder system as shown in FIG. 5A, according to an embodiment of the present disclosure.

FIG. 5A shows another example of the fishing rig 306 detection by the fish finder system 100, according to an embodiment of the present disclosure. FIG. 5B and FIG. 5C show display examples of the fishing rig 306 detection by the fish finder system 100 as shown in FIG. 5A, according to an embodiment of the present disclosure.

Referring to FIG. 5A. the transducer 110 of the fish finder system 100 may be the multi-beam transducer. As discussed earlier, the multi-beam transducer may transmit the ultrasonic signal 112 into the three directions to detect the position of the fishing rig 306 within the water body 109 in addition to objects such as the seabed 104 and the one or more fish schools 106 present under the sea surface 108. For example, the three different directions include the port direction on left of the vessel 102, the downward direction below the vessel 102, and the starboard direction on right of the vessel 102.

The fish finder system 100 may be equipped with a triple beam display mode to display the position of the fishing rig 306 in addition to objects such as the seabed 104 and the one or more fish schools 106 present under the sea surface 108. In the triple beam display mode, the transducer 110 draws three different screens within the display screen 202 for the ultrasonic signal 112 transmitted in each of the three directions. For example, the port screen 404 to display echo image from the port direction, the downward screen 406 to display echo image from the downward direction, and the starboard screen 408 to display echo image from the starboard direction.

According to the present embodiment, the fishing rig 306 is detected by the ultrasonic signal 112 transmitted in the downward direction by the transducer 110. Therefore, the transducer 110 displays the fishing rig 306 on the downward screen 406 of the display screen 202, as shown in FIGS. 5B-5C.

The triple beam display mode by the transducer 110 helps to understand the condition of the seabed 104, depth of the fish school 106, and the position of the fishing rig 306 with respect to the vessel 102 in each of the three directions. Further, the triple beam display mode helps to understand the distance of the fishing rig 306 from the vessel 102 and the direction of movement of the fishing rig 306 as well as the fish school 106.

It is to be noted that the phrases "fishing rig 306" may correspond to a "targeted fishing rig", and both of which can be in various shapes, such as a hook-shape, a fish-shape (a lure) as shown in FIGS. 7A-7E and FIG. 8A. In an embodiment, the fishing rig 306 can be accompanied with a weight so that the fishing string shall sink into the water body 109 easily.

Figure 6:
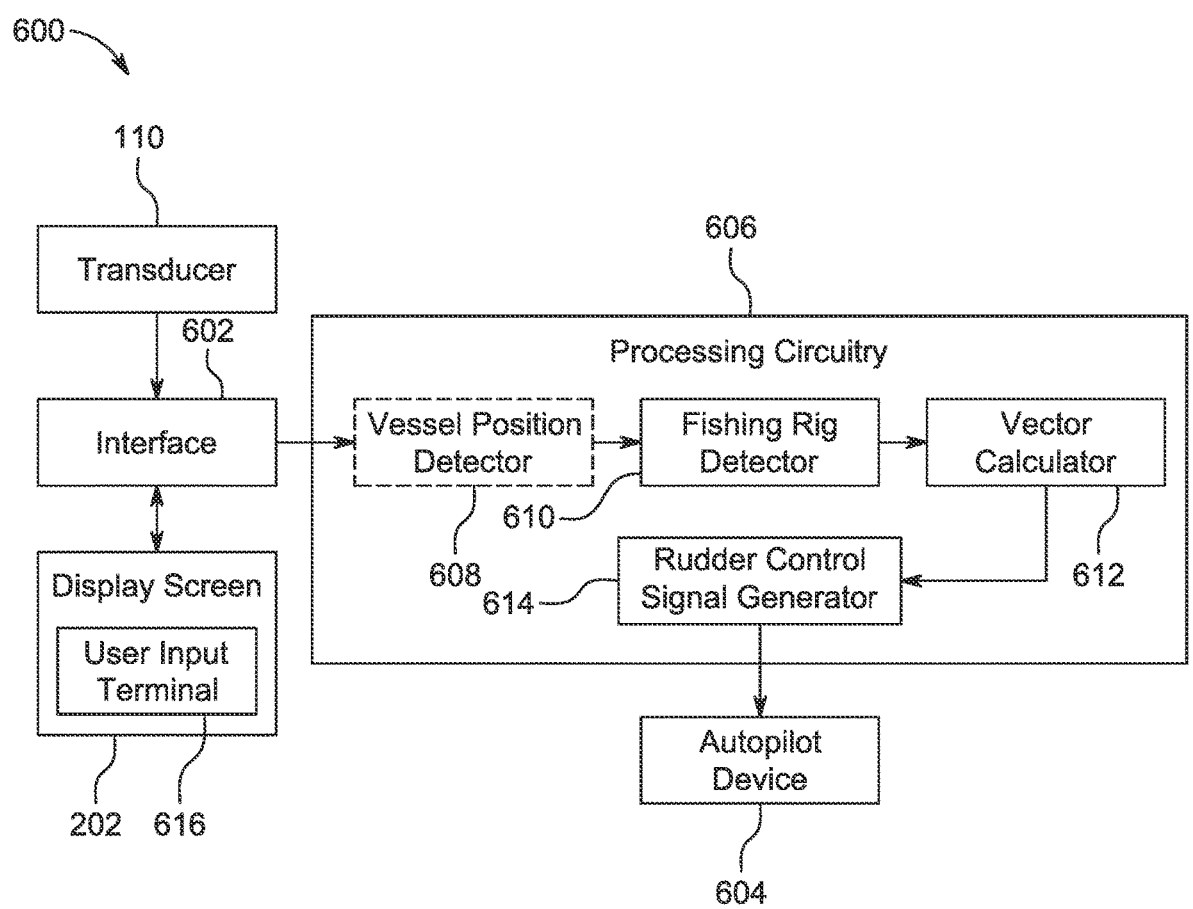
FIG. 6 is a block diagram for measuring a vector from the vessel to the fishing rig by the fish finder system, according to an embodiment of the present disclosure.

FIG. 6 is a block diagram 600 for measuring a vector from the vessel 102 to the fishing rig 306 by the fish finder system 100, according to an embodiment of the present disclosure.

According to the aspect of the present disclosure, the fish finder system 100 may comprise an interface 602 to connect with the transducer 110 and an autopilot device 604. The fish finder system 100 may further comprise processing circuitry 606. The processing circuitry 606 may comprise a vessel position detector 608 (optional), a fishing rig detector 610, a vector calculator 612 and a rudder control signal generator 614. Further, the fish finder system 100 may comprise the display screen 202. The display screen 202 may comprise a user input terminal 616.

Further, the interface 602 may be communicatively coupled to the processing circuitry 606. The transducer 110 may be configured to transmit the ultrasonic signal 112 into the water body 109 and receive the reflected echo signal 114 from the objects present within the water body 109. The objects may include the seabed 104, the fish school 106, the fishing rig 306, and other objects present within the water body 109.

The autopilot device 604 may be configured to control a rudder (not shown) that is attached to the vessel 102. It may be noted that the autopilot device 604 controls the rudder to manipulate movement of the vessel 102. For example, to move in forward direction, to move backward direction or to take a U-turn. It is also possible for an advanced type of the autopilot device 604 to control the engine and the speed in addition to the rudder.

Alternatively, the vessel position detector 608 may be configured to detect a position of the vessel 102. The fishing rig detector 610 is configured to detect position of the fishing rig 306. The vector calculator 612 is configured to measure a vector from the vessel 102 to the fishing rig 306. The rudder control signal generator 614 is configured to generate a rudder control signal for the autopilot device 604 to control the rudder based on the measured vector. The processing circuitry 606 is configured to detect the position of the vessel 102 by the vessel position detector 608 and to detect the position of the fishing rig 306 by the fishing rig detector 610. Further, the processing circuitry 606 is configured to generate the rudder control signal for the autopilot device 604 to control the rudder based on the measured vector by the vector calculator 612. The rudder control signal is generated so as to cancel the measured vector and thereafter the fishing rig 306 is displayed on the display screen 202. In an embodiment, the vessel position detector 608 is configured to detect a relative position of the fishing rig 306 based on a transmitted beam pattern, a transmitted beam mode, a transmitted frequency and/or a transmitted beam width by the fishing rig detector 610 independent of the position of the vessel 102. It will be apparent to a person skilled in the pertinent art that the vessel position detector 608 may correspond to a global positioning system (GPS) receiver pre-installed on the vessel 102.

In an embodiment, the user input terminal 616 may be configured to receive at least one user input related to the position of the fishing rig 306. For example, the user input terminal 616 may receive a tap on the display screen 202 from a user when the fishing rig 306 is displayed on the display screen 202. The processing circuitry 606, based on the at least one user input, detects the position of the fishing rig 306.

In another embodiment, the processing circuitry 606 may automatically detect the position of the fishing rig 306 on the display screen 202 without any input from the user.

Figure 7A:
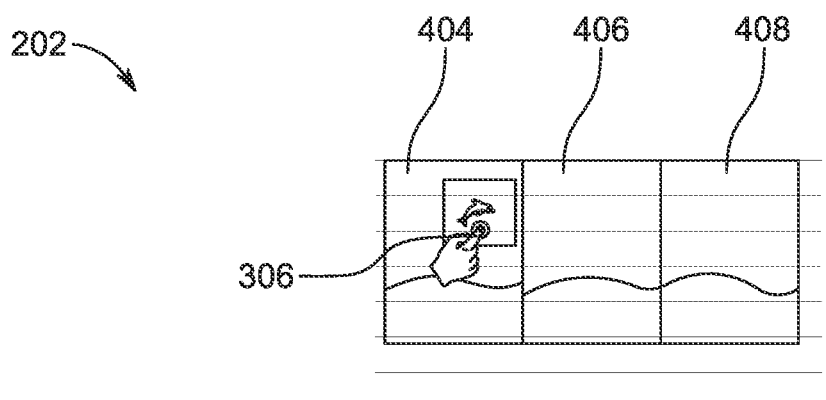
FIG. 7A is showing the display screen for reception of at least one user input on the display screen of the fish finder system, according to the first aspect of the present disclosure.
Figure 7B:
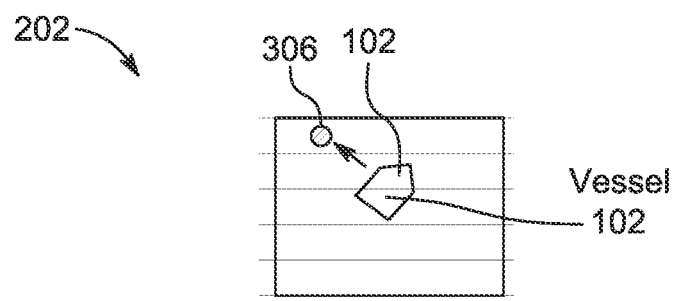
FIG. 7B is showing the display screen displaying movement of the vessel, according to the first aspect of the present disclosure.
Figure 7C:
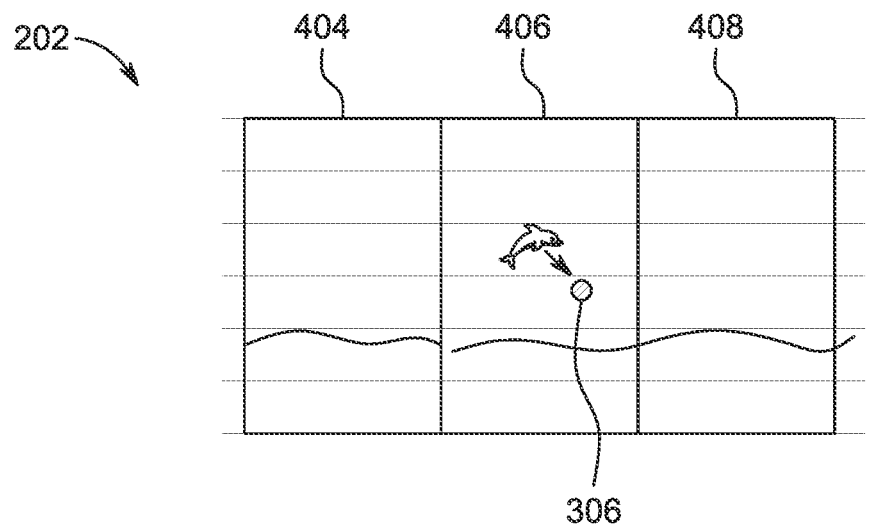
FIG. 7C is showing the display screen displaying the fishing rig on a downward screen of the display screen, according to the first aspect of the present disclosure.
Figure 7D:
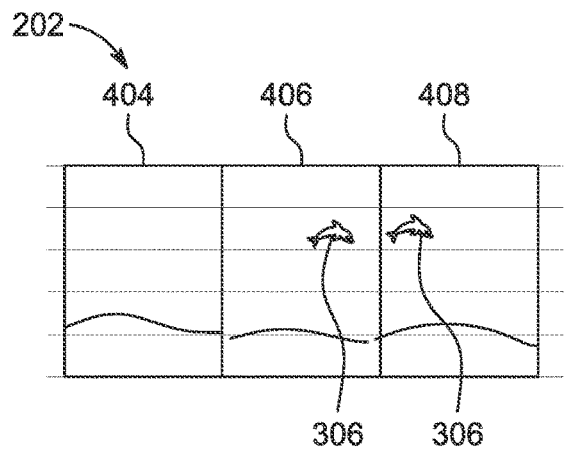
FIG. 7D is showing the display screen displaying the fishing rig on the downward screen and a starboard screen of the display screen, according to the first aspect of the present disclosure.
Figure 7E:
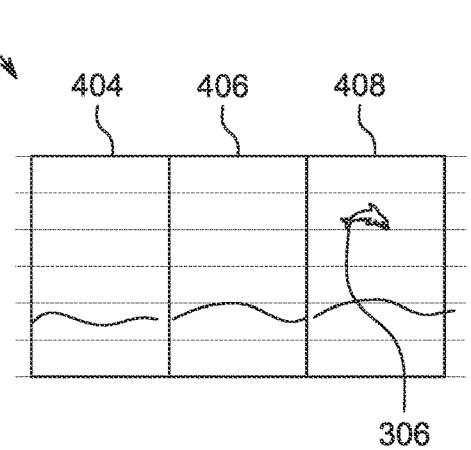
FIG. 7E is showing the display screen displaying the fishing rig on the starboard screen of the display screen, according to the first aspect of the present disclosure.

FIG. 7A is showing the display screen 202 for reception of the at least one user input on the display screen 202 of the fish finder system 100, according to the first aspect of the present disclosure. FIG. 7B is showing the display screen 202 displaying movement of the vessel 102 in a top view mode of FIG. 4C, according to the first aspect of the present disclosure. FIG. 7C is showing the display screen 202 displaying the fishing rig 306 on the downward screen 406 of the display screen 202, according to the first aspect of the present disclosure. FIG. 7C is a top view of FIG. 4C. FIG. 7D is showing the display screen 202 displaying the fishing rig 306 on the downward screen 406 and the starboard screen 408 of the display screen 202, according to the first aspect of the present disclosure. FIG. 7E is showing the display screen 202 displaying the fishing rig 306 on the starboard screen 408 of the display screen 202, according to the first aspect of the present disclosure.

According to the first aspect, the display screen 202 of the fish finder system 100 displays the fishing rig 306. Further, the display screen 202 receives the at least one user input related to the position of the fishing rig 306 on the display screen 202. The fishing rig 306 is a fish-shaped fishing rig, as shown in FIGS. 7A-7E, and FIG. 8A. For example, as the at least one user input, the display screen 202 may receive a tap of a finger from the user on the fishing rig 306 being displayed on the display screen 202, as shown in FIG. 7A. In an embodiment, the display screen 202 may receive a click using any input device such as a computer mouse.

The processing circuitry 606 detects the position of the fishing rig 306 on the display screen 202, based on the at least one user input received from the user. Further, the processing circuitry 606 measures the position of the vessel 102 and measures the vector from the vessel 102 to the fishing rig 306. Based on the measured vector, the processing circuitry 606 generates the rudder control signal for the autopilot device 604 to control and move the vessel 102 and so as to cancel the measured vector, as shown in FIG. 7B. Thus, it would be accomplished to keep the vessel 102 above the fishing rig 306 and to continuously display it within the display screen 202.

Further, if the fishing rig 306 is being displayed in the port screen 404 of the display screen 202, the processing circuitry 606 further generates the rudder control signal. The autopilot device 604, based on the generated rudder control signal, further moves the vessel 102 so as to display the fishing rig 306 on the downward screen 406, as shown in FIG. 7C.

Similarly, if the fishing rig is being displayed in both the downward screen 406 and the starboard screen 408 or only in the starboard screen 408, as shown in FIGS. 7D-7E, the processing circuitry 606 of the fish finder system 100 generates the rudder control signal. Based on the generated rudder control signal, the autopilot device 604 moves the vessel 102 so as to display the fishing rig 306 on the downward screen 406.

Figure 8A:
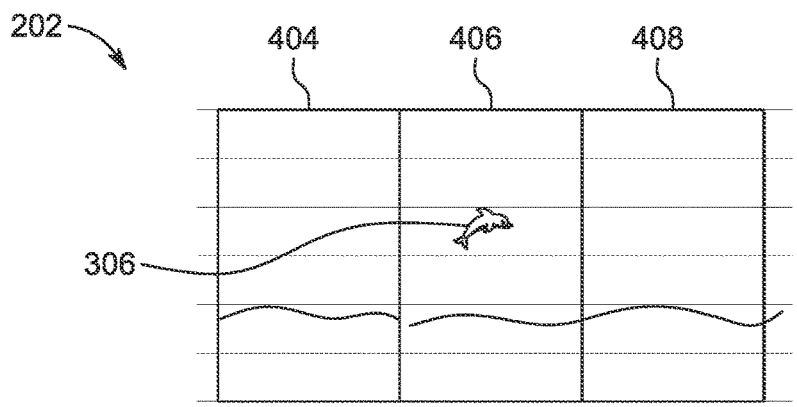
FIG. 8A is showing the display screen displaying a size of the fishing rig decreasing on the downward screen of the display screen, according to an embodiment of the present disclosure.
Figure 8B:
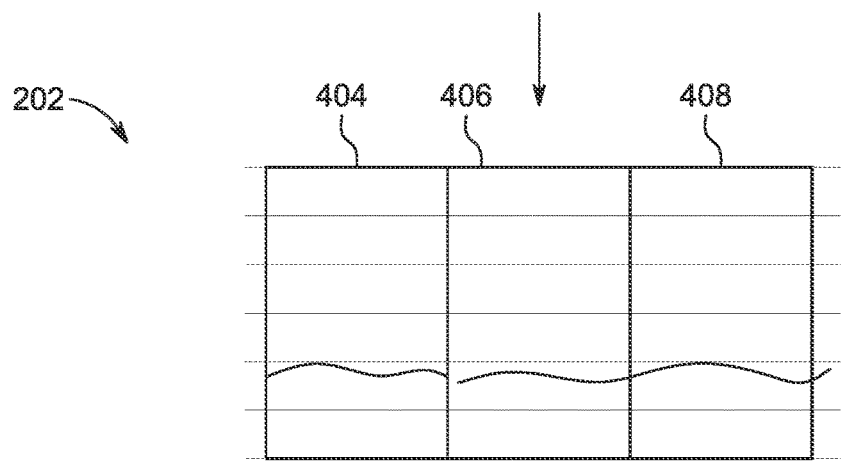
FIG. 8B is showing the display screen displaying the fishing rig disappeared on the downward screen of the display screen, according to an embodiment of the present disclosure.

FIG. 8A is showing the display screen 202 displaying a size of the fishing rig 306 decreasing on the downward screen 406 of the display screen 202, according to an embodiment of the present disclosure. FIG. 8B is showing the display screen 202 displaying the fishing rig 306 disappeared on the downward screen 406 of the display screen, according to an embodiment of the present disclosure.

According to the first aspect, the fish finder system 100 monitors the size of the fishing rig 306 on the downward screen 406 of the display screen 202. The size of the fishing rig 306 decreases on the downward screen 406 or the fishing rig 306 disappears on the downward screen 406 if the vessel 102 overtakes or drifts away from the fishing rig 306, as shown in the FIG. 8A-8B.

In such cases, the processing circuitry 606 generates the rudder control signal for the autopilot device 604. The autopilot device 604, based on the generated rudder control signal, controls the rudder of the vessel 102 so as to move the vessel 102 in the forward direction, the backward direction, or to take the U-turn. Thus, it would be accomplished to display the fishing rig 306 on the downward screen 406 of the display screen 202.

Figure 9:
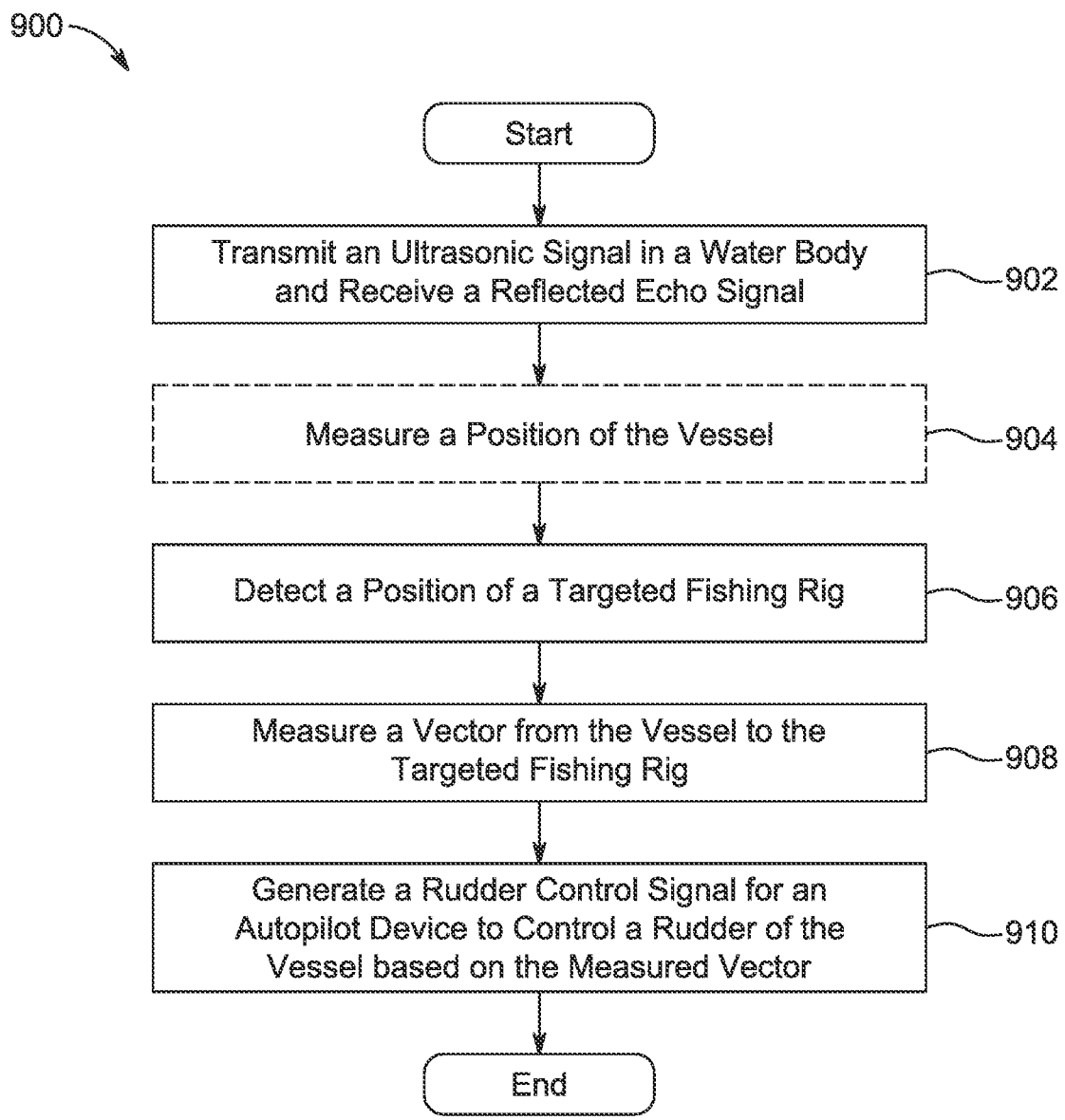
FIG. 9 is a flowchart of a method of measuring a vector from the vessel to the fishing rig and generating a rudder control signal by the fish finder system, according to the first aspect of the present disclosure.

FIG. 9 is a flowchart 900 of a method of measuring a vector from the vessel 102 to the fishing rig 306 and generating the rudder control signal by the fish finder system 100, according to the first aspect of the present disclosure.

Referring to FIG. 9, the transducer 110 may be configured to transmit the ultrasonic signal 112 in the water body 109 and receive the reflected echo signal 114, at step 902. For example, the transducer 110 may transmit the multi-beam ultrasonic signal such as the fan-shaped ultrasonic signal or the single beam ultrasonic signal in the three different directions.

Alternatively, the processing circuitry 606 may be configured to measure the position of the vessel 102, at step 904 in a conventional way, such as by GNSS and/or by receiving the position information via an AIS from other vessels or a land-based AIS station (AIS Base Station). For example, the position measured is 38.84° N, 135.00° E. It will be apparent to the person skilled in the pertinent art that the vessel position detector 608 may correspond to the GPS receiver pre-installed on the vessel 102.

Successively, the processing circuitry 606 may be configured to detect the position of the targeted fishing rig 306, at step 906. For example, the detected position of the targeted fishing rig 306 is 45.00° N, 140.44° E at a depth of 35 meters within the water body 109.

Further, the processing circuitry 606 may be configured to measure the vector from the vessel 102 to the targeted fishing rig 306, at step 908. For example, the vector is measured by calculating a difference of the north components and the east components of the vessel 102 and the targeted fishing rig 306, squaring the calculated difference values, adding the squared values, and then square rooting the added value which results as a magnitude of the vector. It may be noted that step 904 can be skipped as long as the relative position of the fishing rig 306 from the vessel 102 can be obtained at step 906.

Successively, the processing circuitry 606 may generate the rudder control signal for the autopilot device 604 based on the measured vector, at step 910. For example, the rudder control signal is generated for the autopilot device 604 to control and move the rudder of the vessel 102 and cancel the calculated vector between the vessel 102 and the targeted fishing rig 306.

Figure 10:
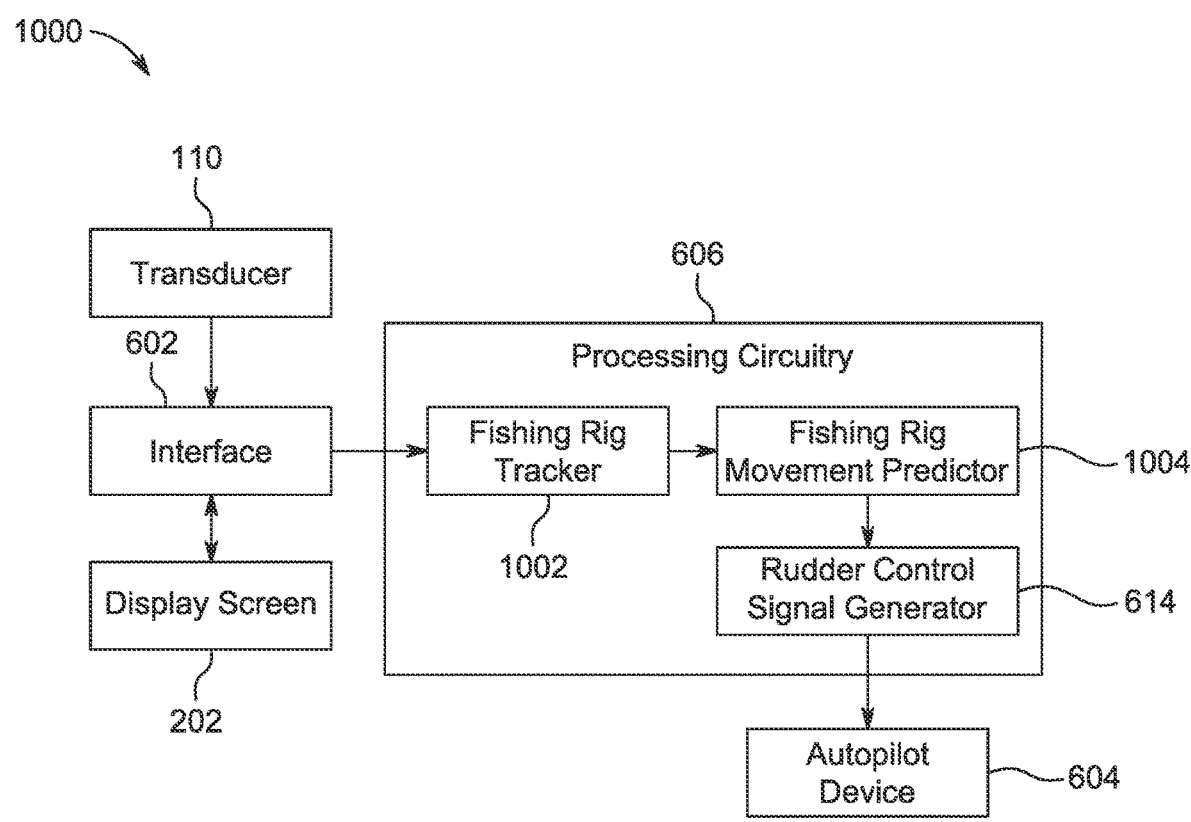
FIG. 10 is a block diagram for predicting movement of the fishing rig by the fish finder system, according to the second aspect of the present disclosure.

FIG. 10 is a block diagram 1000 for predicting movement of the fishing rig 306 by the fish finder system 100, according to the second aspect of the present disclosure.

According to the second aspect, the fish finder system 100 may comprise the interface 602 to connect with the transducer 110 and the autopilot device 604. The fish finder system 100 may further comprise the processing circuitry 606. The processing circuitry 606 may comprise a fishing rig tracker 1002, a fishing rig movement predictor 1004, and the rudder control signal generator 614. Further, the fish finder system 100 may comprise the display screen 202.

The processing circuitry 606 observes deviation of the fishing rig 306 with the vessel 102 on the display screen 202. Based on the observed deviation, the processing circuitry 606 predicts the movement of the fishing rig 306 and generates the rudder control signal.

The autopilot device 604, based on the rudder control signal, moves the vessel 102 inverse to the deviation observed on the display screen 202.

The fishing rig tracker 1002 may be configured to detect a signal from a reflector or a sonde installed on the fishing rig 306. In one embodiment, the processing circuitry 606 may detect the fishing rig 306 based on the reflected echo signal 114 or a received signal from the sonde at the fishing rig tracker 1002. It is to be noted that, even without a reflector nor a sonde being installed on the fishing rig 306, the fishing rig detector 610 and/or the fishing rig tracker 1002 can detect the fishing rig 306 based on the reflected echo signal 114 by the ordinary means.

The fishing rig movement predictor 100 predicts the movement of the fishing rig 306 based on the reflected echo signal 114 or a received signal from the sonde at the fishing rig tracker 1002 in the processing circuitry 606.

Further, the rudder control signal generator 614 may generate the rudder control signal based on the predicted movement of the fishing rig 306.

Figure 11:
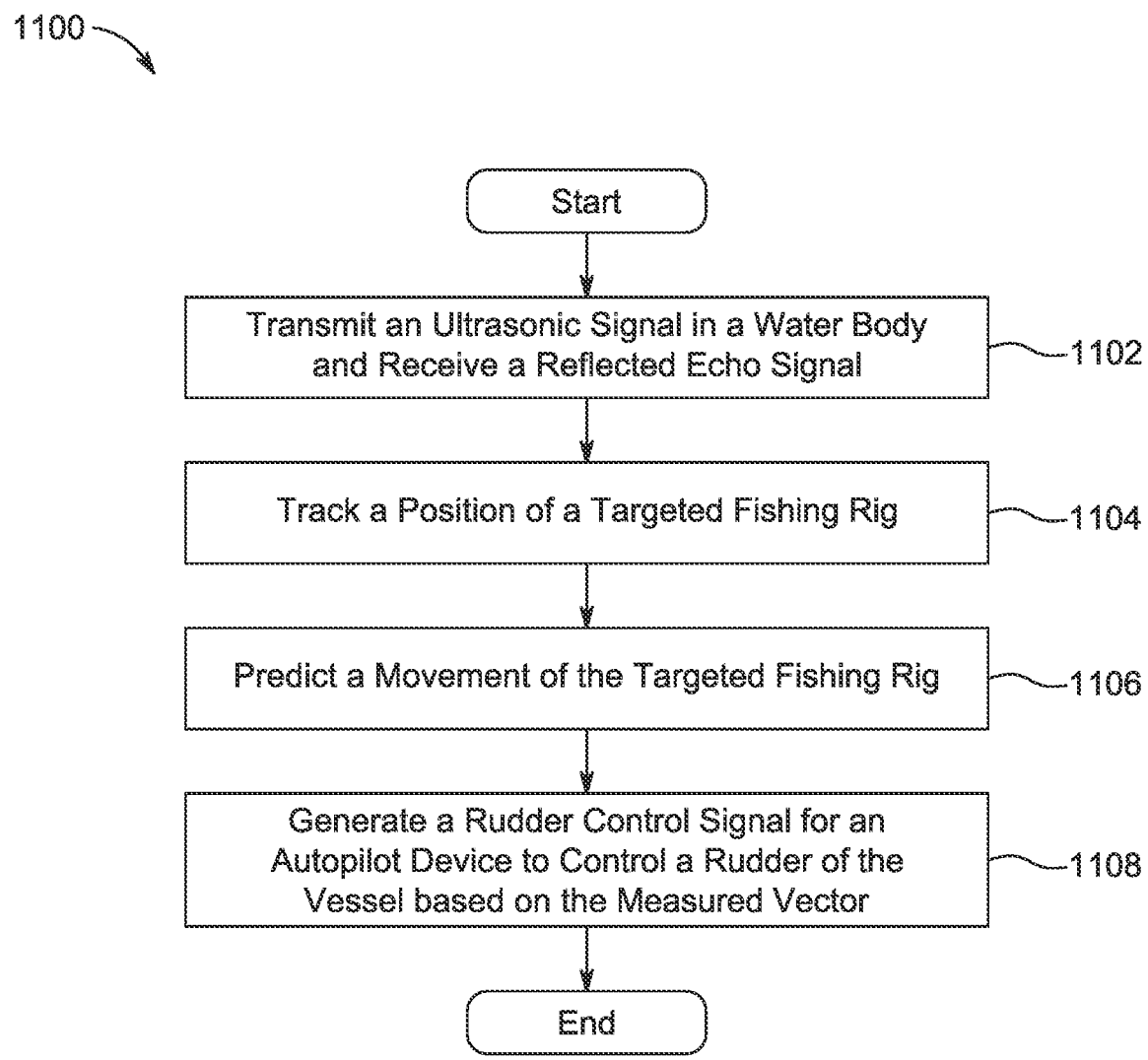
FIG. 11 is a flowchart of a method of predicting movement of the fishing rig and generating a rudder control signal by the fish finder system, according to the second aspect of the present disclosure.

FIG. 11 is a flowchart 1100 of a method of predicting movement of the fishing rig 306 and generating a rudder control signal by the fish finder system 100, according to the second aspect of the present disclosure.

Referring to FIG. 11, the transducer 110 may be configured to transmit the ultrasonic signal 112 in the water body 109 and receive the reflected echo signal 114, at step 1102. For example, the transducer 110 may transmit the multi-beam ultrasonic signal such as the single beam ultrasonic signal in three different directions.

Further, the processing circuitry 606 may be configured to track a position of the targeted fishing rig 306, at step 1104. For example, the position tracked is 38.84° N, 135.00° E.

Further, the processing circuitry 606 may be configured to predict the movement of the targeted fishing rig 306, at step 1106. For example, the deviation of the targeted fishing rig 306 from the vessel 102 on the display screen 202 is observed to predict the movement of the targeted fishing rig 306.

Successively, the processing circuitry 606 may generate the rudder control signal for the autopilot device 604 based on the predicted movement of the fishing rig 306, at step 1108. For example, the rudder control signal is generated for the autopilot device 604 to control and move the rudder of the vessel 102 inversely to the observed deviation.

Figure 12:
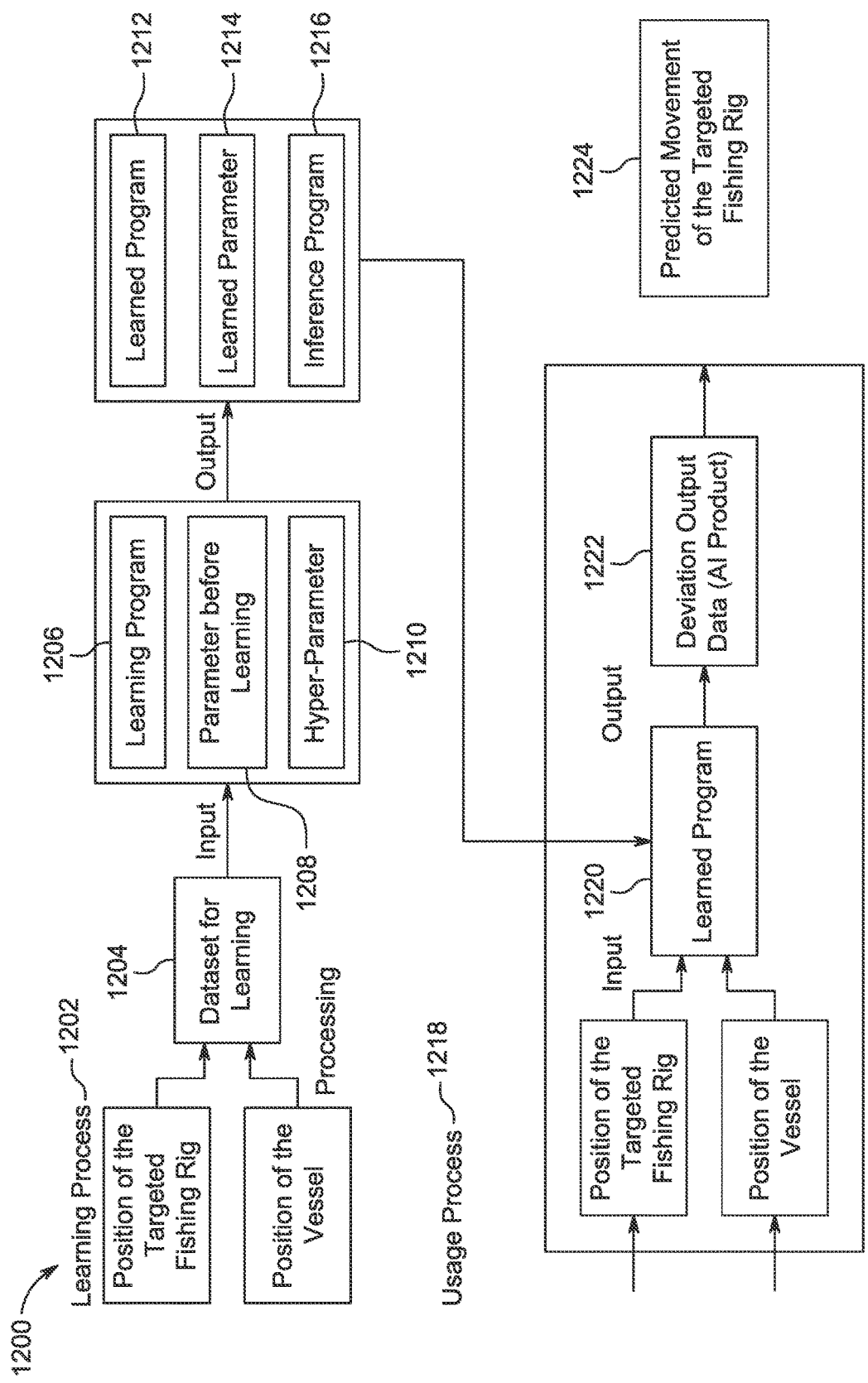
FIG. 12 is a block diagram of a machine learning assembly, according to an embodiment of the second aspect of the present disclosure.

FIG. 12 is a block diagram of a machine learning assembly 1200, according to an embodiment of the second aspect of the present disclosure.

The machine learning assembly 1200 may be configured to train a neural network to predict the movement of the fishing rig 306 and generate the rudder controls signal by using actual values of the input data as a training data and configured to input the input data to the neural network by the machine learning assembly 1200 as a reference.

The neural network is provided with i) a pair of the position of the targeted fishing rig 306 and the position of the vessel 102 or ii) the relative position of the targeted fishing rig 306 from the position of the vessel 102 as the input data. The machine learning assembly 1200 is configured to train the neural network for predicting the movement of the fishing rig 306 by using the input data as the training data. The machine learning assembly 1200 is configured to enter the training data to the neural network as the reference and predict the movement of the fishing rig 306 based on the training data.

As earlier mentioned, the deviation amount is calculated based at least on i) a pair of the position of the targeted fishing rig 306 and the position of the vessel 102 or ii) the relative position of the targeted fishing rig 306 from the position of the vessel 102 and the deviation amount is output.

The machine learning assembly 1200 may comprise a learning process 1202. The learning process 1202 comprises the fishing rig tracker 1002 configured to input the absolute or relative position of the fishing rig 306 and the vessel position detector 608 configured to input the position of the vessel 102 when necessary. The i) pair of the position of the targeted fishing rig 306 and the position of the vessel 102 or ii) the relative position of the targeted fishing rig 306 from the position of the vessel 102 may be transmitted to a dataset for learning 1204.

Further, the dataset for learning 1204 may be communicably coupled to a learning program 1206 for transmission of the input data. The learning program 1206 provides a trainer/assessor with information about the competencies and suggestions for an assessment strategy. The learning program 1206 may be supervised or unsupervised. The learning program 1206 is configured to process the output data to a parameter before learning 1208. The parameter before learning 1208 is a configuration variable internal to a model and whose value may be estimated from data received from the learning program 1206. The parameter before learning 1208 is configured to transmit the output data to a hyper parameter 1210. The hyper parameter 1210 is a configured to process parameter to the model for the value that may not be estimated from data and send an output to a learned program 1212 of the machine learning process 1202.

The learned program 1212 may also be supervised or unsupervised. Further, the learned program 1212 is configured to transmit the output data to a learned parameter 1214. The learned parameter 1214 provides the trained information about the competencies and suggestions for the assessment strategy. The learned parameter 1214 is a configuration variable internal to the model and whose value may be estimated from data received from the learned program 1212. The learned parameter 1214 is configured to transmit live data points into an interference program 1216 to calculate the learned output data.

Further, the machine learning assembly 1200 comprises a usage process 1218. The usage process comprises the fishing rig tracker 1002 configured to input the absolute or relative position of the targeted fishing rig 306 and the vessel position detector 608 configured to input the position of the vessel 102 when necessary. The i) pair of the position of the targeted fishing rig 306 and the position of the vessel 102 or ii) the relative position of the targeted fishing rig 306 from the position of the vessel 102 may be transmitted to a learned program 1220 of usage process 1218. The learned program 1220 of the usage process 1218 is configured to obtain a result of a deviation amount of the fishing rig 306 with the vessel 102 as a deviation output data 1222. Thus, the machine learning assembly 1200 is configured to predict movement of the targeted fishing rig (shown by 1224).

The above embodiments are exemplary in all respects and are not restrictive. The scope of the disclosure is set forth in the claims, not in the above description, and includes the meaning of and all variations within the scope of the claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey those certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A fish finder system for a vessel, comprising:
   an interface to connect with a transducer configured to transmit an ultrasonic signal into a water body and receive a reflected echo signal;
   an autopilot device configured to control a rudder being attached to the vessel; and
   processing circuitry communicatively coupled to the interface, and configured to:
      detect a fishing rig;
      measure a vector from the vessel to the fishing rig;
      generate a rudder control signal for the autopilot device to control the rudder based on the measured vector, wherein
   the transducer is further configured to transmit a fan-shaped ultrasonic signal into the water body or transmit an ultrasonic signal into three directions of the water body, and receive the reflected echo signal; and
   the processing circuitry is further configured to:
      track the fishing rig;
      predict a movement of the fishing rig; and
      generate the rudder control signal based on the predicted movement of the fishing rig.

2. The fish finder system of claim 1, wherein
   the three directions correspond to port, downward, and starboard.

3. The fish finder system of claim 1, wherein
   the processing circuitry is configured to output the rudder control signal to the autopilot device to control the rudder of the vessel based on the predicted movement of the fishing rig.

4. The fish finder system of claim 1, wherein
   the processing circuitry is configured to
   detect the fishing rig based on a reflected echo signal from a reflector implemented on the fishing rig.

5. A fish finder system for a vessel, comprising:
an interface to connect with a transducer configured to transmit an ultrasonic signal into a water body and receive a reflected echo signal;
an autopilot device configured to control a rudder being attached to the vessel; and
processing circuitry communicatively coupled to the interface, and configured to:
 detect a fishing rig;
 measure a vector from the vessel to the fishing rig;
 generate a rudder control signal for the autopilot device to control the rudder based on the measured vector, wherein
the processing circuitry is further configured to have:
 a neural network with a position of the fishing rig and a position of the vessel as an input data; and
 a machine learning assembly configured to train the neural network for predicting the movement of the fishing rig by using the input data as a training data, and configured to:
enter the training data to the neural network learned by the machine learning assembly as a reference; and
predict the movement of the fishing rig based on the training data.

6. The fish finder system of claim 1, wherein
the processing circuitry is further configured to have a vessel position detector to detect a position of the vessel.

7. A method comprising:
transmitting an ultrasonic signal into a water body and receiving a reflected echo signal, using a transducer;
detecting a position of the fishing rig;
measuring a vector from a vessel to the fishing rig;
generating a rudder control signal for an autopilot device to control a rudder of the vessel based on the measured vector;
transmitting a fan-shaped ultrasonic signal into the water body or transmitting an ultrasonic signal into three directions of the water body, and receiving the reflected echo signal;
generating the rudder control signal based on the measured vector;
tracking the fishing rig;
predicting a movement of the fishing rig; and
generating the rudder control signal based on the predicted movement of the fishing rig.

8. The method of claim 7, wherein
the three directions correspond to port, downward, and starboard.

9. The method of claim 7, further comprising:
outputting the rudder control signal to the autopilot device to control the rudder of the vessel based on the predicted movement of the fishing rig.

10. The fish finder system of claim 5, wherein the ultrasonic signal is transmitted as a fan-shaped ultrasonic signal into the water body or is transmitted into three directions of the water body, the three directions corresponding to port, downward, and starboard.

11. The fish finder system of claim 5, wherein
the processing circuitry is configured to output the rudder control signal to the autopilot device to control the rudder of the vessel based on the predicted movement of the fishing rig.

12. The fish finder system of claim 5, wherein
the processing circuitry is further configured to have a vessel position detector to detect a position of the vessel.

13. The fish finder system of claim 5, wherein
the processing circuitry is configured to
detect the fishing rig based on a reflected echo signal from a reflector implemented on the fishing rig.

* * * * *